Dec. 13, 1955 — E. A. COUGHLIN — 2,726,476
FISH TACKLE FLOATS
Filed May 20, 1952
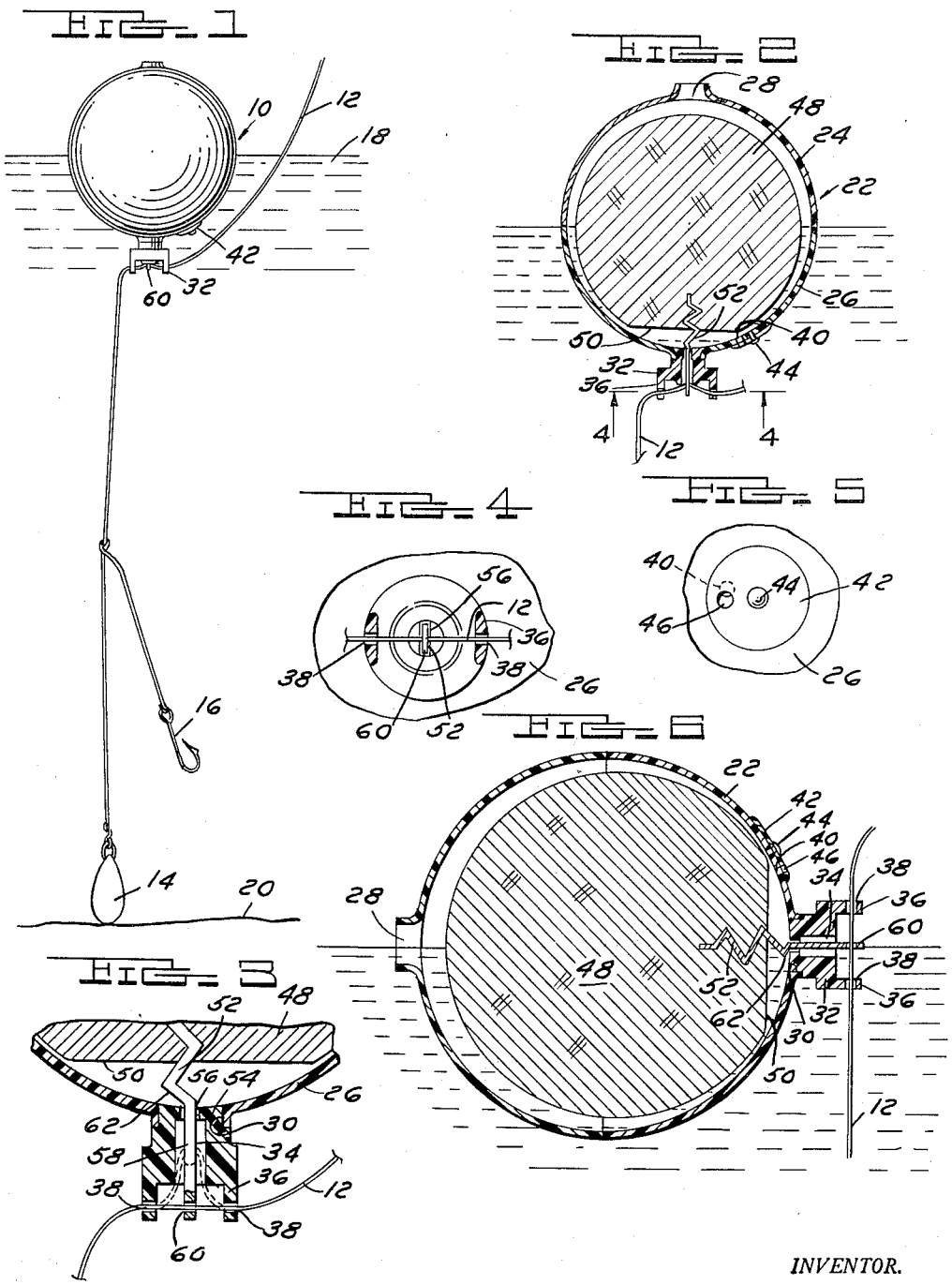
INVENTOR.
EARL A. COUGHLIN
BY
Barnes, Kisselle, Laughlin & Raisch
ATTORNEYS

United States Patent Office 2,726,476
Patented Dec. 13, 1955

2,726,476

FISH TACKLE FLOATS

Earl A. Coughlin, Detroit, Mich.

Application May 20, 1952, Serial No. 288,887

4 Claims. (Cl. 43—44.88)

This invention relates to fish tackle floats or bobs and more particularly relates to a float for a fish line which is capable of automatically adjusting the distance of the hook and the length of line extending from the float.

The float construction of this invention is an improvement over the float described and claimed in my prior Patent No. 2,531,806, dated November 28, 1950. The float shown in said prior patent generally comprises a hollow ball float and a buoyant float within the ball float which is movable in response to the change in water level within the ball float to clamp or clinch a fishing line which extends downwardly through the ball float. Although the prior patented float has proved in use to be very desirable, I have found that the necessity of threading the fishing line between the clamping members on the float and axially through the upright tube on the float is sometimes undesirable. The operation of threading the line through the float is not at all difficult when the float and the line are dry; but when either the float or the line is wet, the line has a tendency to adhere to the tube and threading the line through the float is therefore rendered somewhat difficult.

The present invention therefore contemplates a float of the general type described in said prior patent, the construction of the present float, however, being such that it is not necessary to thread the line through the float itself. The clamping members are disposed exteriorly of the float rather than interiorly of the float as shown in my prior patent.

Another feature of my present float which I believe to be an improvement over my prior float resides in the provision of an adjustable port on the ball float which enables adjustment of the rate at which the ball float fills with water. This in turn enables the initial adjustment of the float so that the line is clamped or locked by the clamping members after a predetermined length of line has slipped freely through the clamping members. This latter feature is important because usually it is desirable that the length of line extending from the float be equal to the depth of the water at the locus of fishing. With my prior float the ball float member always fills with water at substantially the same rate, and in the case of relatively deep water there is a possibility that the clamping members will move into clamping engagement with the line before the sinker at the end of the line reaches the bottom.

Furthermore, the construction of my present float enables adjustment of the float to permit the fisherman to fish at almost any predetermined depth off bottom where neither the hook nor the sinker touches bottom.

These and other advantages of the present float construction will appear more fully in the following description when taken in conjunction with the accompanying drawings in which Fig. 1 is a side elevational view of the float of my present invention illustrating the relative position of the float line with the surface of the water and the water bottom.

Fig. 2 is a central vertical sectional view through the float showing the line in the clinched position.

Fig. 3 is a fragmentary sectional view showing the clamping mechanism of the float on an enlarged scale.

Fig. 4 is a fragmentary sectional view along the lines 4—4 in Fig. 2.

Fig. 5 is an enlarged detail view of a portion of the outer or ball float member showing in particular the adjustable inlet port connection.

Fig. 6 is a central vertical sectional view through the float, similar to Fig. 2, and showing the float tipped on its side with the line passing through the clamping members of the float.

In Fig. 1 the float, generally designated 10, is illustrated in conjunction with a fishing line 12 having a sinker 14 at the lower end thereof and a fish hook 16 connected with the line 12 at a point located upwardly of the sinker 14. The surface of the water is indicated at 18 and the water bottom is indicated at 20.

As is shown more particularly in Fig. 2, the float 10 comprises a ball member 22 which is made in two half sections 24 and 26 which are cemented or otherwise secured together. The ball member 24 is preferably made of plastic or some other suitable material. On its upper side ball 22 is provided with an opening 28, and on its lower side the ball 22 is provided with an opening 30 in which is fitted a plug 32 forming an exterior collar. Plug 32 is also preferably molded from plastic and is fashioned with a generally cylindrical central passage or bore 34 and a pair of spaced apart legs 36 which straddle passage 34. Legs 36 are provided with aligned apertures 38 through which the fish line 12 may be extended.

At one side of plug 32 ball member 22 is provided with a water inlet port 40. A disc 42 rotatably supported on the wall of ball 22 as by a rivet 44 has an opening 46 therein which is arranged upon the rotative adjustment of disc 42 to register with opening 40. Thus, by rotating disc 42 the effective size of the opening 40 may be readily controlled.

Within ball float member 22 there is arranged a buoyant float 48 which is formed of cork or other permanently buoyant material. The buoyant float 48 has considerable clearance with the interior of the ball member 22 so that the float 48 is permitted a certain amount of free movement within ball 22. Float 48 is preferably of general spherical shape, the bottom side of the float being flattened as at 50 and having a lug 52 projecting downwardly therefrom.

The passage 34 is generally cylindrical in shape and is partially closed at its upper end by a wall portion 54. Wall 54 is formed wtih a slot 56 through which the lower end of lug 52 extends. The flat and relatively thin straight portion 58 of lug 52 is freely movable vertically through slot 56. At its lower end the straight portion 58 of lug 52 is provided with an aperture 60, and at its upper end the straight portion 58 is fashioned with a shoulder 62 arranged to abut against the wall 54 of plug 32 to limit the extent of downward movement of float 48. Shoulder 62 is positioned relative to the aperture 60 in the straight portion 58 so that, when the shoulder 62 abuts against the wall portion 54 of plug 32, the aperture 60 is aligned with the apertures 38 and the lug 36 of plug 32.

In the operation of my float the line 12, with the sinker 14 and hook 16 attached thereto, is threaded through the aligned apertures 38, 60, 38. When the line with the float attached thereto is cast into the water, the float will assume an upright position as shown in Fig. 2, and the weight of the sinker 14 will tend to draw the line through the apertures 38, 60, 38. At the same time, however, the ball member 22 will begin to fill with water through the partially or wholly registering openings 40, 46. As soon as the amount of water within ball member 22 is sufficient to exert a buoyant effect on the float member 48, the float member 48 will begin to rise within the ball 22; and the lug 52 will move upwardly in the passage 34 and tend to draw the line 12 with it. After a certain interval of time, depending upon the extent to which opening 40 registers with opening 46, the buoyant float member 48 will have risen sufficiently to cause the lug 52 to draw a portion of the line 12 upwardly into passage 34 to a position wherein the line is locked in place by the snubbing action of the edge of plug 32 around the lower end of passage 34.

The members 22 and 48 are dimensioned and the member 48 is formed of a sufficiently buoyant material to insure a positive snubbing action between the line 12 and the edge of plug 32 at the lower end of passage 34 which is sufficient to overcome the tendency of the sinker 14 to pull the line through apertures 38, 60, 38. Thus, under some circumstances, the line will be snubbed before the sinker 14 reaches the bottom surface 20.

After using the float for a short time, a fisherman will have determined the extent to which openings 40 and 46 should be in registration to permit the line to be drawn down to a desired predetermined depth before it is snubbed by the lug 52. For example, if at the side of fishing the depth of the water is approximately 20 feet and the fisherman desires to fish at a depth of say 15 feet, he will adjust the disc 42 to a position wherein the openings 40 and 46 register to an extent such that the water will flow into the registering portions of these openings at a rate such that, after the interval of time required for the sinker to pull the line downwardly to a depth of 15 feet, the water in ball 22 will have reached a level which causes the buoyant float 48 to lift the lug 52 the extent necessary to securely snub the line and thereby prevent additional line from passing through the apertures 38, 60, 38.

The present float construction has another desirable advantage in connection with adjustment of the line at any particular depth desired. For example, when the float is in the position illustrated in Fig. 2 with the line in the snubbed or locked condition, the line may be jerked or lifted slightly to cause the float to roll over on its side to the position illustrated in Fig. 5. In this position a slight jerk on the line will bring the aperture 60 in the lug 52 into alignment with the apertures 38 on the legs 36 and thereby enable either more or less line to be passed freely through these registering openings. If the fisherman desires to extend his line to a deeper depth, he then merely pays out more line which is drawn through the openings 38, 60, 38. After he has paid out the desired amount of line, the weight of the sinker 14 acting on the float through the plug 32 will cause the plug to again assume its upright position. Thereafter, the buoyant force on the float 48 will again raise the float 48 in the ball member 22 and cause the lug 52 to snub or clinch the line in the new position of adjustment.

Thus, the plug 32 cooperates with the lug 52 to provide a pair of relatively movable clamping members which are arranged to be brought into clamping engagement with the line by reason of the buoyant force on the float member 48 and which are arranged to be brought into a position releasing the line for free movement thereof by simply jerking the line itself. This easy and automatic adjustment feature of the present float, coupled with the fact that the clamping members are disposed exteriorly of the ball float so that the line can be readily threaded therethrough, is highly desirable from the standpoint of the facility with which the float may be adjusted for any particular depth. At the same time, these features provide a construction which is admirably adapted for economical manufacture.

I claim:

1. A fishing bob of the character described comprising a buoyant float, a ball float provided by walls forming a hollow chamber with a water inlet, said buoyant float being disposed within said ball float and having clearance with the walls thereof so that when the ball float is disposed in and at least partially filled with water, said buoyant float is permitted to move substantially therein in response to the buoyant force acting on the said buoyant float, said ball float having an exterior collar portion projecting vertically downwardly from the lower side thereof, said collar portion having a generally cylindrical bore, said buoyant float having a leg member projecting vertically downwardly through said collar portion, the portion of said leg passing through said bore being flat and relatively thin as compared with the diameter of said bore, said portion of said leg having a width less than the diameter of said bore so that said leg is movable freely in said bore, said leg member having substantially flat opposite sides and a means at the free end thereof for freely interengaging a line to permit the line to slip freely past said leg when the buoyant float is in its lowermost position in said ball float, said leg being arranged to recede and pull a portion of the line upwardly generally in the form of a U into said collar when the buoyant float rises in said ball float in response to a rise in the water level in said chamber with the portion of the line forming the legs of the U disposed between the opposite flat faces of the leg and circumferential surface of said bore, the vertical spacing between the line engaging means on said leg and the lower end of said collar portion, when the buoyant float is in the raised position in said ball float, being sufficient to produce a substantial snubbing action on the line at the lower edges of the collar and at said line engaging means to lock the line against slipping past said leg when the line is pulled upwardly into said collar portion in response to a rise in the water level in said chamber.

2. The combination called for in claim 1 wherein said water inlet is adjustable in size to permit adjusting the rate at which water will flow into said chamber through said inlet when said bob is disposed in water and thereby adjust the time required for the buoyant float to cause snubbing of the line.

3. The combination set forth in claim 1 wherein said collar portion is provided with a pair of diametrically aligned openings through which the line may be freely threaded, said leg being disposed intermediate said openings.

4. The combination set forth in claim 3 wherein the lower end of said leg is provided with an opening through which the line may be freely threaded, said opening being aligned with said opposed openings in said collar portion when said buoyant float is in its lowermost position in said ball float.

References Cited in the file of this patent

UNITED STATES PATENTS

| | | |
|---|---|---|
| 35,449 | Hudson | June 3, 1862 |
| 150,517 | Brooks | May 5, 1874 |
| 1,371,170 | Johnson | Mar. 8, 1921 |
| 2,527,437 | Matras | Oct. 24, 1950 |
| 2,531,806 | Coughlin | Nov. 28, 1950 |

FOREIGN PATENTS

| | | |
|---|---|---|
| 11,318 | Great Britain | 1911 |